United States Patent [19]

Quaglia et al.

[11] 4,386,161

[45] May 31, 1983

[54] PROCESS FOR THE PREPARATION OF INCOAGULABLE BLOOD BY MEANS OF PROTEOLYTIC ENZYMES AND PROTEIN CONCENTRATE PREPARED THEREFROM

[75] Inventors: Giovanni B. Quaglia; Angelo Massacci, both of Rome, Italy

[73] Assignee: Consiglio Nazionale Delle Ricerche, Rome, Italy

[21] Appl. No.: 255,566

[22] Filed: Apr. 20, 1981

[30] Foreign Application Priority Data

Jan. 23, 1981 [IT] Italy ............................... 19292 A/81

[51] Int. Cl.$^3$ .............................................. C07G 7/00
[52] U.S. Cl. ..................................... 435/269; 426/32; 260/112 B
[58] Field of Search ..................... 426/32, 56; 435/269; 260/112 B

[56] References Cited

U.S. PATENT DOCUMENTS

| | | | |
|---|---|---|---|
| 1,403,892 | 1/1922 | Butterfield | 435/269 |
| 2,456,297 | 12/1948 | Melnick | 426/32 X |
| 2,471,282 | 5/1949 | Paddock | 426/56 |
| 3,046,197 | 7/1962 | Harper | 435/269 X |
| 3,672,954 | 6/1972 | Grippa | 435/269 |
| 3,928,630 | 12/1975 | Perini | 426/56 X |
| 4,262,022 | 4/1981 | Christensen et al. | 426/32 |

*Primary Examiner*—Robert A. Yoncoskie
*Attorney, Agent, or Firm*—Bucknam & Archer

[57] ABSTRACT

Proteolytic enzymes, particularly papain, are used for rendering whole blood incoagulable. The treatment is preferably carried out at a pH of 7.2 with a ratio between enzyme and substrate, for instance, 1:200, and a volume ratio of 1:10. In the case of papain, a 1.6% solution is advantageously used. The incoagulable blood may be used to prepare a protein concentrate by precipitating the proteins with an agent, for instance, acetone or ethanol, preferably at 0° C. in the presence of hydrochloric acid.

6 Claims, No Drawings

PROCESS FOR THE PREPARATION OF INCOAGULABLE BLOOD BY MEANS OF PROTEOLYTIC ENZYMES AND PROTEIN CONCENTRATE PREPARED THEREFROM

The present invention relates to proteolytic enzymes and more specifically to the use of proteolytic enzymes for the purpose of preventing the coagulation of blood. Still more specifically, the present invention relates to the use of papain as a proteolytic agent to prevent the coagulation of blood. The present invention also relates to a process for the preparation of a protein concentrate from whole blood.

It is well known that fresh blood has been collected and utilized for a long time for a variety of industrial processes, such as the production of glue and the use of blood for the production of fertilizers and animal feed. Very recently, some investigators have conceived the idea of using fresh blood as a source of proteins for human consumption. The use of blood, however, has met with great difficulties because of the rapid modification which blood undergoes a few minutes after it has been collected, modification which leads to the formation of coagulates and clots.

The principal phase of this phenomenon consists of the transformation of fibrinogen into fibrin in the form of thin, insoluble filaments. These filaments represent one of the most serious problems which limit the applicability of blood. In order to prevent this phenomenon or at least to decrease the extent to a point which is within practically acceptable limits, innumerable systems have been used. In view of the fact that the presence of calcium ions is essential for the coagulation, one of the most common methods to prevent coagulation consists of using chemical substances, such as sodium citrate or citric acid or oxalic acid or the salts of oxalic acid which precipitate the calcium ions in the form of insoluble salts. Also heparin which is a natural anticoagulant produced by the liver finds useful applications but particularly because of its high cost, the use of heparin has been limited to pharmaceutical applications.

Other substances which have been used as anticoagulants are phosphates, ethylenediaminetetraacetate and allylisothiocyanate.

Another method which is based on a different principle to prevent the formation of the coagulates is to carry out the defibrination of blood. To achieve this result, blood must be stirred immediately after it is collected and the fibrin must be separated as soon as it is formed.

Very recently, the problem of coagulation of blood has received particular attention. Among the methods which have been used more recently, the use of electric current produced by a battery at low anodic and cathodic potential must be mentioned (Andersen, 1971); this method is suitable also for the decoagulation of blood which has already been coagulated.

Another process of great interest is the homogenization (Haughey, 1973) which permits the transformation of the coagulants into a very fine dispersion which may be subsequently dried on a fluidized bed.

Finally, one should mention the use of ozone (Summer, 1976) which is produced by ultraviolet radiation in air.

All these methods which have been used up to now or which have been proposed for the purpose of preventing the coagulation of blood intended for industrial use present one or more of the following drawbacks:

The very high cost of the necessary agents;

Use of chemical substances which are toxic or inadequate to the subsequent utilization of blood for human consumption;

Necessity of using complicated apparatuses and technology which are difficult in practice.

It has now been found, surprisingly, that it is possible to prevent coagulation of blood by adding a suitable proteolytic enzyme.

The process according to the present invention is based upon the finding that the mechanism involved in the coagulation of blood involves several factors typical of proteins and the coagulation may be prevented by making use of a partial enzymatic hydrolysis of the proteins by means of a suitable proteolytic enzyme. Several enzymes are known which are capable of achieving this result. Among these enzymes there should be mentioned fibrinolysin or plasmin which act on fibrinogen, an enzyme present in blood in an inactive form and which may be activated by means of urokinase, an enzyme which is extracted from urine. Other proteolytic enzymes suitable within the scope of the present invention are bromelin, trypsin and papain. All these enzymes have given excellent results in the present invention. The preferred enzyme is papain which in contrast with the other enzymes is readily available, is stable, may be extracted with relative ease and is, therefore, obtainable at a price which is acceptable in the quantities necessary for use. For this reason, although the invention is in general applicable to any proteolytic enzyme, it will be described hereinbelow with particular reference to the use of papain which is the preferred proteolytic enzyme.

Papain is commonly used in its water-soluble form. However, it should be noted that in addition to the forms which are soluble in water, immobilized forms of papain are well known. The tests which have been carried out in the development of the present invention have shown that both forms of papain give equivalent results as agents to prevent the coagulation of blood.

The treatment of blood with proteolytic enzymes, preferably papain, must be carried out at a physiological pH, that is within the range of the point of neutrality. The tests which have been carried out have indicated that the pH range is between 7 and 7.5 which is most suitable. Optimum results are obtained at a pH of 7.2.

Another factor of great importance is the ratio between enzyme and substrate. This ratio must be minimized for obvious economical reasons. In any event, it is necessary not to use a ratio which is below the value necessary to render the blood incoagulatable in a period of time shorter than the necessary period of time to carry out the process of coagulation. This ratio, enzyme:substrate should not be lower than 2:100. The concentration of the enzymatic solution may be varied within ample limits. Optimum values have been obtained in many tests, also as far as this parameter is concerned. The preferred concentration is 1.6%. When a solution of enzyme of this concentration is used, one finds that the optimum ratio between the volume of the enzymatic solution and the volume of blood is 1:10.

The use of operative conditions which have been indicated as preferred not only gives the advantage of obtaining the desired result in the best possible way as far as the amount of proteolytic enzyme being used, but also permits to retain as much as possible unaffected the functional characteristics of the proteins of blood.

The possibility of utilizing an economical and effective method in the process of rendering blood incoagulable permits to utilize this incoagulable blood for a variety of purposes and particularly, as a starting material for a protein concentrate.

The present invention, therefore, relates also to a process for obtaining a protein concentrate from whole blood. This process may be carried out using blood as soon as it has been collected after the animal is killed with the soluble enzyme or with the enzyme in a form which is immobilized for the purpose of rendering blood incoagulable as it has been described hereinabove. Blood which has been so treated is mixed with acetone or ethanol at low temperature, preferably at 0° C. with addition of 0.1–0.3%, preferably 0.2% of 2 N hydrochloric acid in accordance with a method known in the literature (Rossi-Fanelli A., et al., 1958).

The known method, however, may be improved in accordance with the present invention because one advantage, which is not of secondary importance, connected with the use of papain and other proteolytic enzymes as agents to prevent the formation of coagulates is the following: the proteolytic enzyme renders the bond heme-globin more labile. The result is that during the phase of extraction of heme, the consumption of the agent of extraction, acetone or ethanol, is less than the consumption which has been necessary up to now. In accordance with the method of this invention, in fact, it is sufficient to use a ratio of 1:20. The process in accordance with the present invention permits to obtain with great ease a colorless precipitate which consists of proteic material.

The yield in the process described hereinabove is very high because in actual practice, it is possible to recover in a very economical manner all the proteic material of the blood.

The product has a high proteic content derived from the proteins of the blood corpuscles fraction, 70% and a good biological value (21) derived essentially from proteins of plasma which have a chemical index of 58 with respect to the value 7 of globin.

The following examples are described hereinbelow for the purpose of illustrating the present invention but are not intended to be limitative.

EXAMPLE 1

Determination of the Minimum Value of the Ratio Enzyme/proteic Substrate (E/S)

The minimum value of E/S is the value for which the period of time required to render the blood incoagulable is shorter than the period of time necessary to permit the process of coagulation to take place.

Papain is dissolved in distilled water at a variable concentration with respect to the proteic substrate in order to determine the minimum inhibiting value of E/S. In order to permit homogenization of the solution of the enzyme in a great volume of blood, use has been made of a container suitable for this purpose which is provided with a system which permits to achieve the contact of the enzyme at different levels with the blood being treated.

The results of the tests show the following optimal conditions of use of papain:

| pH | 7.2 |
| --- | --- |
| Ratio E/S | 2:100 |
| Concentration of enzyme | 1.6% |

-continued

| Volume ratio of the enzymatic solution to blood | 1:10 |
| --- | --- |

EXAMPLE 2

Preparation of Incoagulable Blood

A sample of fresh blood is subjected to immediate treatment with an enzyme solution of papain of 1.6% concentration. The ratio in volume between the enzymatic solution and the treated blood is 1:10. This ratio corresponds to a ratio between enzymes and proteic substrate of 2:100. The pH of the blood at the time of treatment is adjusted to 7.2. The process of coagulation of blood is therefore inhibited and the blood remains stable for a sufficient period of time and may be subjected to subsequent treatments while avoiding the drawbacks which would be caused by the formation of coagulates.

EXAMPLE 3

Preparation of Proteic Concentrate

A sample of fresh blood is treated immediately after it has been collected, with papain under the optimal conditions described in the preceeding Example 2 for the purpose of achieving a partial hydrolysis. The blood which has been partially hydrolyzed is then treated with acetone or ethanol in the ratio of 1:20 (v/v) at a temperature of 0° C. There is added 2 N hydrochloric acid of 0.2% concentration. In this manner, the heme acid separates from the globin which forms a white precipitate together with other proteins of blood. The precipitate is isolated by pump filtration.

In this manner, there is obtained a proteic concentrate which on analysis gives the following results:

| Total nitrogen | 14.04% |
| --- | --- |
| Non-protein nitrogen | 7.15% |
| Moisture | 4.35% |
| Ash | 4.56% |

What is claimed is:

1. A process for rendering blood incoagulable which consists of treating said blood before coagulation sets in with a proteolytic enzyme which is a member selected from the group consisting of papain, fibrinolysin, plasmin, bromelin and trypsin, as soon as it has been collected at a pH of 7–7.5, the ratio between the enzyme and the proteolytic substrate is 2:100, the enzyme solution is of 1.6% concentration, the ratio by volume of the enzyme solution to blood is 1:10, and allowing partial hydrolysis to occur just sufficient to render said blood incoagulable.

2. The process according to claim 1, wherein said proteolytic enzyme is papain in a water soluble form or in an immobilized form.

3. A process for the preparation of a protein concentrate from whole blood which comprises treating said whole blood as soon as it has been collected and before coagulation sets in with a proteolytic enzyme which is a member selected from the group consisting of papain, fibrinolysin, plasmin, bromelin and trypsin at a pH of 7–7.5, in the ratio of enzyme to substrate of 2:100, said treating allowing partial hydrobysis to occur just sufficient to render said blood incoagulable and immediately thereafter treating said incoagulable blood with one part of acetone or ethanol per 20 parts of said incoagulable blood in the presence of an acid whereby proteins are separated from heme and isolating a protein concentrate.

4. The process according to claim 3, wherein the proteolytic enzyme is papain in a water soluble form or in an immobilized form.

5. The process according to claim 3, wherein the treatment with acetone or ethanol is carried out at 0° C., and 2 N hydrochloric acid in the amount of 0.2% is added.

6. A protein concentrate from whole blood which contains 70% proteins, which has a biological value of 21, prepared by the process according to claim 3.

* * * * *